Nov. 27, 1934.    H. H. ROBINSON ET AL    1,982,072
COUPLING FOR TRACTOR TRAILER COMBINATIONS
Filed Jan. 5, 1933

INVENTORS.
HAROLD H. ROBINSON
AND HUGH A. ROBINSON, SR.
BY Chapin + Neal
ATTORNEYS.

Patented Nov. 27, 1934

1,982,072

UNITED STATES PATENT OFFICE 1,982,072

COUPLING FOR TRACTOR TRAILER COMBINATIONS

Harold H. Robinson and Hugh A. Robinson, Sr., Opa Locka, Fla., assignors to Curtiss Aerocar Company, Inc., Opa Locka, Fla., a corporation of Florida Application January 5, 1933, Serial No. 650,346

7 Claims. (Cl. 280—33.1)

This invention relates to mechanism for coupling a trailer to its tractor. More particularly, it relates to certain improvements in that type of coupling wherein the coupling action between the vehicles is cushioned in all the directions of draft action by a pneumatic cushion encircling the coupling pin.

Among the objects of the invention are greater security in the coupling, greater ease in assembly of the parts and economy in manufacture. Other and further objects will be apparent from the following specification and claims.

In the accompanying drawing which illustrates one embodiment of the invention:

Figure 1:
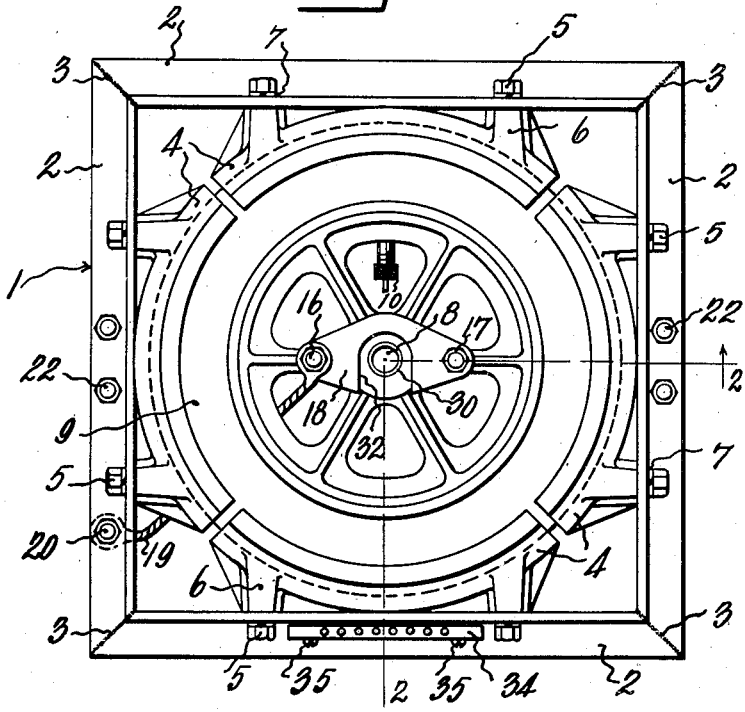
Fig. 1 is a plan view of the device.
Figure 2:
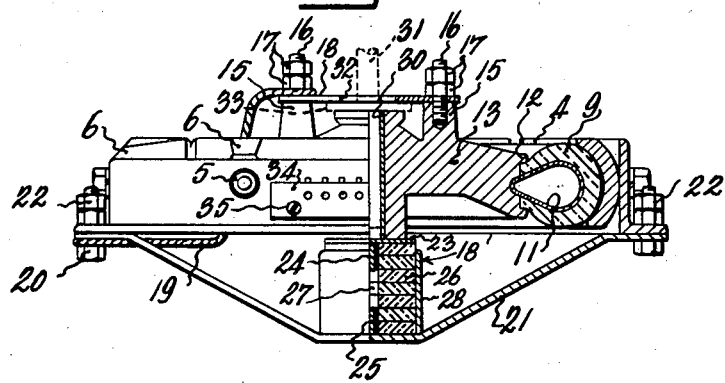
Fig. 2 is an elevation, partly in section, of the structure shown in Fig. 1.

Referring to the drawing, 1 indicates a rectangular frame formed of structural steel angle members 2 which are mitered and welded together at the corners, as indicated at 3. This frame is adapted to be secured in a horizontal position to one of the vehicles of the tractor-trailer combinations in any suitable manner. Positioned within the frame are four segmental blocks 4, one being secured to each side of frame 1 by means of cap screws 5 passing through suitable holes in the verticle web of the angle members 2 and threaded into bosses 6 projecting from blocks 4. Blocks 4 are preferably formed of aluminum. To prevent unintentional loosening of the cap screws 5, each may be provided with a suitable lock washer 7. The blocks 4 have an arcuate inner surface shaped to conform to an annular pneumatic cushion member 9 which preferably takes the form of an automobile tire, provided with an inner tube 11 adapted to be inflated in the usual manner through a valve 10 secured in the tube. The blocks 4 are adapted, when the tire is inflated, to firmly engage the tread portion of the tire and support the tire and its associated parts in position. As best shown in the sectional portion of Fig. 2, the upper edges of the blocks 4 extend inwardly over the tire sufficiently to prevent dislocation of the tire under normal conditions even if the tire should become deflated which would occur, for example, if the tire valve developed a leak.

The tire 9 with its inner tube 11, is mounted on the rim 12 of a wheel 13, rim 12 being of the so-called drop center type which is integral with the wheel and does not require demountable members to keep the tire in place. The wheel 13 has a central bore 8 into which is inserted a bronze bushing 30 for the reception of the coupling pin of the second vehicle as later described, such coupling pin being shown in dotted lines at 31.

Wheel 13 is formed with vertical bosses 14 provided with tapped recesses 15 in which are threaded screws 16 adapted to receive a lock plate 18 which plate is held firmly to the wheel by nuts 17. Lock plate 18 is provided with a U-shaped opening 32 adapted to fit over a suitable flange 33 in the coupling pin of the other vehicle to hold the pin in coupled relation in the bore 8 of the wheel.

Between one of the nuts 17 and lock plate 18 and encircling the screw 16 is clamped one end of a steel cable 19, the other end of which is clamped in a similar manner to frame 1 as at 20. The purpose of cable 19 is to maintain wheel 13 in its position in the event that the tire 9 becomes deflated and subjected, while in that condition, to shocks or strains which dismount it from the rim 12.

The vertical thrust or load upon wheel 13 is absorbed by means of thrust cushion 18' which is supported by a hanger 21 held firmly to frame 2 by bolts 22. The thrust cushion 18' is formed of a series of annular rubber pads 26. These pads are held in alignment by studs 24 and 25, respectively, welded to a thrust plate 23, resting on the upper pad 26, and to the hanger 21. The studs which extend into the central openings 27 of the pads 26 are not long enough to abut at their ends and the alignment of the intermediate pads is provided for by a cylindrical sheet metal casing or shell 28 which fits around the pads 26. Studs 24 and 25 fit loosely in central opening 27 in order that a degree of flow or distortion of the rubber comprising the pads may take place when the pads are under varying compression, and for a like reason shell 28 is fitted loosely around the periphery of the pads. The non-abutting relation of the studs 24 and 25 permits relative vertical movement to take place between them, and permits further freedom of flow of the rubber of the middle pads under the compressive loads and shocks transmitted to the plate 23 through the wheel 13 which rests loosely on said plate.

In many tractor-trailer combinations, various electrical connections between the two vehicles are desirable to supply light current to the trailer from the power plant of the tractor, to provide telephone communication between the vehicles, to operate various instruments, and for other purposes. In order that these connections may be readily broken when the vehicles are uncoupled and as readily reconnected when the vehicles are again coupled, an electrical connection block 34 is secured to one member 2 of frame 1, as by screws 35, adapted to mate with a similar block (not shown) carried by the other vehicle. Thus, all electrical connections may be properly established at one operation.

What we claim is:

1. In a coupling for connecting two vehicles together for articulated tractor-trailer operation, a coupling member adapted to be secured to one of said vehicles which comprises, a unitary frame, a wheel provided at its periphery with a pneumatic tire, positioned within the frame, the hub portion of said wheel being formed with a vertical bore to receive a coupling pin carried by the other vehicle, a plurality of vertically removable arcuate blocks fitting between the frame and the periphery of the tire, the faces of said blocks adjacent the tire being formed to tightly grip the tire when the latter is in inflated condition, means to retain the wheel in position within the frame when the tire is in a deflated condition, and means to releasably secure the blocks to said frame.

2. In a coupling for connecting two vehicles together for articulated tractor-trailer operation, a coupling member adapted to be secured to one of said vehicles which comprises, a unitary frame, a wheel provided at its periphery with a pneumatic tire, positioned within the frame, the hub portion of said wheel being formed with a vertical bore to receive a coupling pin carried by the other vehicle, a plurality of vertically removable arcuate blocks fitting between the frame and the periphery of the tire, the faces of said blocks adjacent the tire being formed to tightly grip the tire when the latter is in inflated condition, means to releasably secure the blocks to said frame and flexible means connecting the wheel directly to the frame to prevent displacement of the wheel when the tire is in a deflated condition or upon accidental dismounting of the tire from the wheel.

3. In a coupling for connecting two vehicles together for articulated tractor-trailer operation, a coupling member adapted to be secured to one of said vehicles which comprises, a unitary frame, a wheel provided at its periphery with a pneumatic tire positioned within the frame, the hub portion of said wheel being formed with a vertical bore to receive a coupling pin carried by the other vehicle, a plurality of vertically removable arcuate blocks fitting between the frame and the periphery of the tire, the faces of said blocks adjacent the tire conforming to the cross-sectional curvature of the tread portion of the tire and adapted when the tire is inflated to tightly grip the tire, the upper edges of the block extending sufficiently over the side walls of the tire to prevent withdrawal of the tire when the latter is in either inflated or deflated condition, and means to releasably secure the blocks to said frame.

4. In a coupling for connecting two vehicles together for articulated tractor-trailer operation, a coupling member adapted to be secured to one of said vehicles which comprises, a unitary frame, a wheel provided at its periphery with a pneumatic tire positioned within the frame, the hub portion of said wheel being formed with a vertical bore to receive a coupling pin carried by the other vehicle, a plurality of vertically removable arcuate blocks fitting between the frame and the periphery of the tire, the faces of said blocks adjacent the tire conforming to the cross-sectional curvature of the tread portion of the tire and adapted when the tire is inflated to tightly grip the tire, the upper edges of the block extending sufficiently over the side walls of the tire to prevent withdrawal of the tire when the latter is in either inflated or deflated condition, means to releasably secure the blocks to said frame, and a flexible cable connecting the wheel directly to the frame to prevent displacement of the wheel upon accidental dismounting of the tire from the wheel.

5. In a coupling for connecting two vehicles together for articulated tractor trailer operation, a coupling member adapted to be secured to one of said vehicles which comprises a unitary frame, a wheel provided at its periphery with a pneumatic tire positioned within the frame, the hub portion of the wheel being formed with a vertical bore to receive a coupling pin carried by the other vehicle, means carried by the wheel for releasably locking the coupling pin within the bore and a plurality of individually removable blocks fitting between the frame and the tire and releasably secured to the frame for securing the tire and wheel within the frame.

6. In a coupling for connecting two vehicles together for articulated tractor trailer operation, a coupling member adapted to be secured to one of said vehicles which comprises a unitary open frame, a wheel provided at its periphery with a pneumatic tire positioned within the frame, the hub portion of the wheel being formed with a vertical bore to receive a coupling pin carried by the other vehicle, means vertically insertable between the periphery of the tire and the frame to hold the tire in position in the frame in both an inflated and uninflated condition and means to releasably secure said vertically insertable means to the frame when in tire holding position.

7. In a coupling for connecting two vehicles together for articulated tractor trailer operation, a coupling member adapted to be secured to one of said vehicles which comprises a unitary open frame, a wheel provided at its periphery with a pneumatic tire positioned within the frame, the hub portion of the wheel being formed with a vertical bore to receive a coupling pin carried by the other vehicle, means vertically insertable between the periphery of the tire and the frame to hold the tire in position in the frame in both an inflated and uninflated condition, means to releasably secure said vertically insertable means to the frame when in tire holding position, a transverse member secured at its ends to opposite sides of the frame and having its central portion offset below the frame, and cushion means resting on said offset portion and in engagement with the underside of the wheel hub.

HAROLD H. ROBINSON.
HUGH A. ROBINSON, Sr.